United States Patent
Lindoff et al.

(10) Patent No.: US 7,046,720 B2
(45) Date of Patent: May 16, 2006

(54) SYSTEM AND METHOD FOR DC OFFSET COMPENSATION IN A WCDMA RECEIVER

(75) Inventors: Bengt Lindoff, Bjärred (SE); Peter Malm, Lund (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 899 days.

(21) Appl. No.: 10/011,571

(22) Filed: Nov. 12, 2001

(65) Prior Publication Data

US 2003/0091101 A1    May 15, 2003

(51) Int. Cl.
*H04B 1/69* (2006.01)
*H04B 1/707* (2006.01)
*H04B 1/713* (2006.01)

(52) U.S. Cl. ..................... 375/147; 375/319
(58) Field of Classification Search ............. 375/147, 375/319; 455/343
See application file for complete search history.

(56) References Cited

U.S. PATENT DOCUMENTS

| | | | | |
|---|---|---|---|---|
| 4,706,093 A | * | 11/1987 | Groth, Jr. .................. 342/427 |
| 5,862,173 A | * | 1/1999 | Dent .......................... 375/149 |
| 6,064,688 A | * | 5/2000 | Yanagi ....................... 375/149 |
| 6,141,372 A | * | 10/2000 | Chalmers .................... 375/147 |

FOREIGN PATENT DOCUMENTS

| | | |
|---|---|---|
| EP | 34650-714 | 7/2002 |
| WO | WO 01/31867 A | 5/2001 |

OTHER PUBLICATIONS

Lindoff, Bengt, "Using a Direct Conversion Receiver in Edge Terminals—a New DC Offset Compensation Algorithm," *IEEE International Symposium on Personal, Indoor and Mobile Radio Communications*, Sep. 18, 2000, pp. 959-963, XP002198497.

Park, C-H et al., "Compensation Techniques for Imbalance and DC-Offset Losses in Bluetooth Receivers" *IEICE Transactions on Communications*, Institute of Electronics Information and Communications Engineers, Tokyo, Japan, vol. E84-B, No. 3, Mar. 2001, pp. 682-687, XP001065632.

* cited by examiner

*Primary Examiner*—Stephen Chin
*Assistant Examiner*—Jia Lu

(57) ABSTRACT

A system and method for DC offset compensation wherein a received first signal is despread using a first spreading code to generate a second signal. The second signal along with a first set of pilot symbols is used to estimate a radio channel. The first signal is also despread using a second spreading code to generate a third signal. A DC offset is estimated from the third signal, the estimated radio channel and a second set of pilot symbols. The estimated DC offset may then be subtracted from the second signal.

12 Claims, 3 Drawing Sheets

Rake finger number i

SYSTEM AND METHOD FOR DC OFFSET COMPENSATION IN A WCDMA RECEIVER

TECHNICAL FIELD

The present invention relates to RAKE receivers within CDMA systems, and more particularly, to a system and method for compensating for DC offsets within a RAKE receiver in a CDMA system.

BACKGROUND OF THE INVENTION

Today's high-performance wireless digital communication systems are based on a radio access method called code division multiple access (CDMA). A particular extension to CDMA is known as wideband CDMA (WCDMA) which is an access method standardized within the 3G partnership project (3GPP). The WCDMA standard is the basis for 3G cellular systems. WCDMA systems provide higher user data rates (bits/sec) than existing CDMA systems. The current WCDMA standard offers up to 2 Mbps user data rate, and even higher data rates are envisioned in the future. A new mode of operation referred to as high speed downlink shared channel (HSDPA) is currently being standardized by 3GPP. HSDPA offers user data rates of up to 10–15 Mbps per user. Such high data rates as those utilized within WCDMA systems impose large demands on the digital receiver architecture of base stations and mobile stations in terms of accuracy and speed. The additional requirements for mobile equipment, as compared to receivers in stationary equipment, include a need for low power consumption and low production cost. These requirements are often contradictory to the new higher data rates.

One solution has been the use of direct conversion (homodyne) receivers. A direct conversion (homodyne) receiver is a high-performance, cost-effective alternative to the traditionally used superheterodyne receivers. However, the disadvantage with direct conversion (homodyne) receivers is that they generate a DC offset. This offset must be cancelled before data detection is commenced because the DC offset will severely degrade the receiver's performance. Many different solutions have been proposed to suppress the DC-components, and the majority of these methods use some kind of averaging to estimate the DC offset within the signal.

A WCDMA system features, as one of the multitude of channels implemented within the system, a common pilot channel (CPICH) used for, for example, channel estimation. A WCDMA system implements a spreading factor (SF) for CPICH of 256 which suppresses the receiver-generated DC offset during the despreading process. The despreading process DC-suppressing ability is proportional to the spreading factor, and, hence, the DC offset is suppressed 24 dB (a factor of 256) when the CPICH is despread.

Each dedicated channel of the WCDMA system also features a number of pilot symbols (dedicated pilot symbols). A user data rate implies a rather low spreading factor on dedicated channels, (i.e., down to SF=4). The low spreading factor implies that the DC offset suppression due to despreading is relatively low, and the dedicated pilot-symbol estimates will contain a DC offset residue. Thus, there is a need for DC offset suppression techniques within high-speed WCDMA systems.

SUMMARY OF THE INVENTION

The present invention overcomes the foregoing and other problems with a RAKE receiver that includes a plurality of fingers enabling DC offset compensation. A first multiplier within each finger despreads a first signal to generate a second signal by multiplication with a first spreading code. A channel estimator estimates radio channels for the first signal from the second signal and a first set of pilot symbols. A second multiplier despreads the first signal to generate a third signal using a second spreading code. A summer estimates received data symbols including a DC offset from the third signal. A DC offset estimator estimates the DC offset for the received signal responsive to the estimated radio channels, the received data symbols including the DC offset, scrambling codes and orthogonal codes. A subtractor subtracts the estimated DC offset from the estimated received data symbols including the DC offset.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
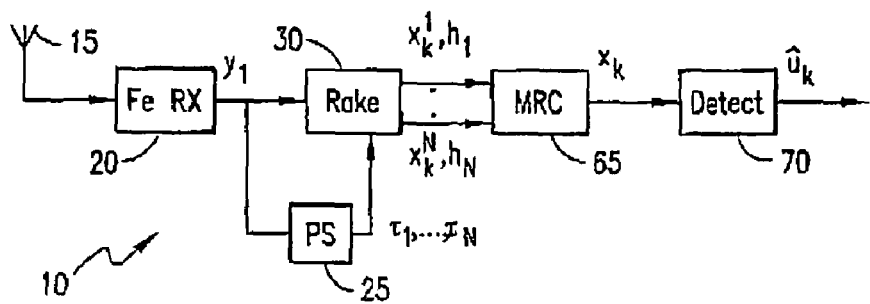
FIG. 1 illustrates a prior art WCDMA receiver.

Referring now to the drawings, and more particularly to FIG. 1, there is illustrated a conventional WCDMA receiver 10. A CDMA signal is received by means of an antenna 15. The received signal is down-converted, analog-to-digital converted, and sampled at a sample rate of M, which is typically 2–4 times the chip rate, to a baseband signal $y_1$ within a front end receiver (Fe RX) 20. The baseband signal $y_1$ is provided to a path searcher (PS) 25. The path searcher 25 determines and outputs the relative time delays $\tau_1, \ldots, \tau_N$ (in samples) between the N dominant radio paths of the received signal. The relative time delays between the N dominant radio paths are used as inputs to a RAKE receiver 30. The signal $y_1$ is an additional input to the RAKE receiver 30. The RAKE receiver 30 despreads the received signal $y_1$ and estimates the radio channel for each radio path (or finger) within the signal $y_1$.

Figure 2:
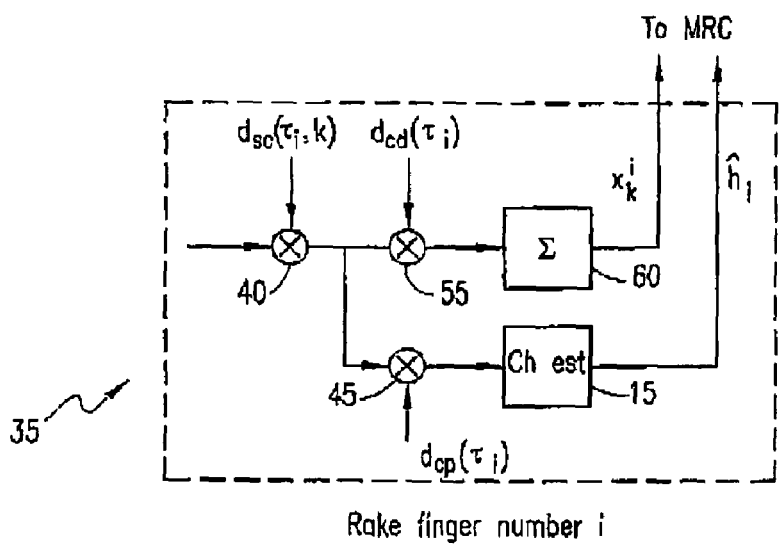
FIG. 2 illustrates a prior art finger of a RAKE receiver.
Figure 3:
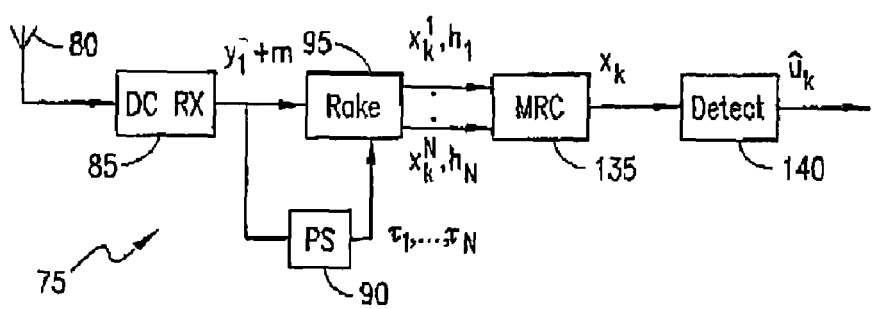
FIG. 3 illustrates the WCDMA receiver of the present invention.

Referring now to FIG. 2 there is illustrated one finger (radio path) of the N fingers within the Rake receiver 30. The signal $y_1$ received from the front end receiver 20 is multiplied at 40 by scrambling code vector $d_{sc}(\tau_I, k)$ where $\tau_I$ is the i:th radio path delay from the path searcher, and k denotes which part of the total scrambling code that is used. The scrambling code vector $d_{sc}(\tau_I, k)$ comprises $SF_1$ chips, and each chip is denoted $d_{sc}(\tau_I,k)$, $1 \leq l \leq SF_1$, since the scrambling code part is related to the symbol's position k in the data sequence. The multiplied signal is divided into two streams. The lower leg in FIG. 3 is despread with the orthogonal code of the pilot channel, $d_{cp}(\tau_I)$ by multiplying it by the orthogonal code of the pilot channel at 45. The despread signal is used to calculate an estimate of the radio channel $\hat{h}_i$ for path i within the channel estimator 50. The signal in the upper leg in FIG. 2 is despread with the orthogonal code for the data channel $d_{cd}(\tau_i)$, by multiplying it by the orthogonal code for the data channel at 55. The despread signal is summed and down-sampled to a symbol rate to provide estimated symbol samples. The symbol samples are denoted $x_k^i$, $1 \leq k \leq N$.

Referring back to FIG. 1, the symbols from each fingers of the RAKE receiver 30 (i=1, ..., N) and the corresponding channel estimates $\hat{h}_i$ from the RAKE receiver 30 are fed to the Maximum Ratio Combining (MRC) unit 65. Maximum Ratio Combining (MRC) unit 65 combines the signals from each of the N fingers 35. The combined signal $x_k$ is fed to the detection unit 70 in order to detect the transmitted symbol. The output from the detection unit 70 is the estimated symbol $\hat{u}_k$. This system, or course, does not use a direct conversion receiver and does not require DC offset correction.

FIG. 3 provides an illustration of a WCDMA receiver 75 according to the present invention. A signal is received via an antenna 80. The received signal is processed by a direct-conversion receiver 85 by down-conversion, analog-to-digital conversion, and sampling at a rate M, typically 2–4 times the chip rate, to generate a digital baseband signal $y_l$+m. The signal $y_l$+m, where m is the DC offset generated in the direct-conversion receiver, is provided to a path searcher (PS) 90. The path searcher 90 provides an output of the relative time delays $\tau_1$ ..., $\tau_N$ between the N dominant radio paths, which is fed to a RAKE receiver along with the digitial baseband signal $y_l$+m. The RAKE receiver 95 despreads the signal and estimates the radio channel for each path.

Figure 4:
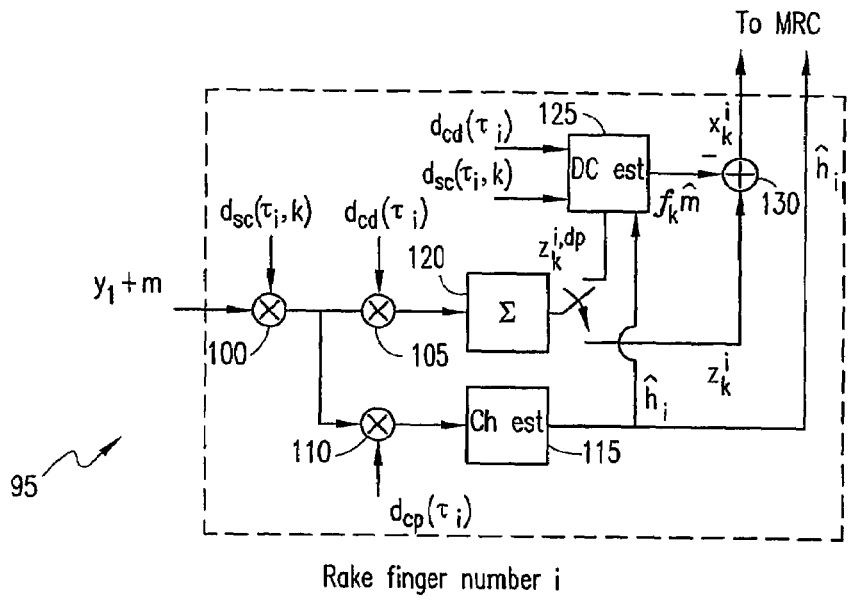
FIG. 4 illustrates a finger of a RAKE receiver according to the present invention.

Referring now to FIG. 4, there is described a finger 98 of the new RAKE receiver 95, i.e., including the DC offset compensation. We assume a multi-path channel signal with N paths where $h_j$ is the radio channel for path j, $d_{sc}(l-\tau_j, k)$ is the scrambling code, $d_{cp}(l-\tau_j)$ is the orthogonal code for the pilot channel, and $d_{cd}(l-\tau_j)$ is the orthogonal code for the dedicated data channel for delay $\tau_j$. All codes are delayed $\tau_j$ chip according to the information from the path searcher 90. Hence, the signal $y_l$ fed to the RAKE receiver 95 may be expressed as a sum $$y_l = \sum_{j=0}^{P} \gamma_j + m + e_l \quad (1)$$

$$= \alpha \sum_{j=0}^{P} h_j d_{sc}(l-\tau_j) d_{cd}(l-\tau_j) u(l-\tau_j, k) +$$

$$\sum_{j=0}^{P} h_j d_{sc}(l-\tau_j) d_{cp}(l-\tau_j) u^P(l-\tau_j, k) + m + e_l.$$

Where $\alpha$ is a scale factor. Further, u(k) is the transmitted data symbol, $u^P(k)$ is the transmitted common pilot symbol, m is the unknown DC offset, and $e_l$ is noise on chip level.

The signal is split into two legs and despread with ($d_{sc}$, $d_{cp}$) and ($d_{sc}$, $d_{cd}$) at multipliers 110 and 105 respectively, and down-sampled to symbol rate. The cross-correlation resulting from the multi-path is included in the noise, i.e., the estimated common pilot symbols in the i:th channel can be expressed $$z_k^{i,p} = h_i u_k^p + \frac{1}{SF_1} \sum_{l=1}^{SF_1} d_{sc}(l-\tau_i, k) d_{cp}(l-\tau_i) m + e_k^{i,p}, \quad (2)$$

$$1 \leq k \leq N_1$$

where $N_1$, is the number of common pilot symbols, and where $e_k^{i,p}$ is despread noise for the k:th common pilot symbol. The estimated dedicated pilot symbols can be expressed in a similar way $$z_k^{i,dp} = \alpha h_i u_k^{dp} + \frac{1}{SF_2} \sum_{l=1}^{SF_2} d_{sc}(l-\tau_i, k) d_{cd}(l-\tau_i) m + e_k^{i,dp}, \quad (3)$$

$$1 \leq k \leq N_2,$$

where $N_2$ is the number of dedicated pilot symbols, and where $e_k^{i,dp}$ is despread noise for the k:th dedicated pilot symbol. The received dedicated channel symbols will be used below but is shown here for completeness. In both of the above two expressions we have used that $|d_{sc}|^2 = |d_{cp}|^2 = 1$ and that $d_{sc}$ and $d_{cp}$ are orthogonal.

Typically, the number of pilot symbols used in the channel estimation process by the channel estimator 115 is about $N_1$=10 ... 15. Considering that the spreading factor of the CPICH, $SF_1$, is large ($SF_1$=256 in WCDMA), and that $d_{sc}$, $(\tau_i, k)$ is a PN-sequence, it is reasonable to assume that $$\frac{1}{N_1} \sum_{k=1}^{N_1} \frac{1}{SF_1} \sum_{l=1}^{SF_1} d_{sc}(l-\tau_i, k) d_{cp}(l-\tau_i) m + e_k \approx 0 \quad (4)$$

Hence, estimating the channel with correlation techniques, e.g., $$\hat{h}_i = \frac{1}{N_1} \sum_{k=1}^{N_1} u_k^p z_k^{i,p} \approx h_i. \quad (5)$$

where $|u_k^p|=1$, gives a good channel estimate.

The despread data signal $z_k^i$ can, in the same fashion as above, be expressed as $$z_k^i = h_i u_k + \frac{1}{SF_2} \sum_{l=1}^{SF_2} d_{sc}(l-\tau_i, k) d_{cp}(l-\tau_i) m + e_k \quad (6)$$

where we have used that $|d_{sc}|^2=|d_{cp}|^2=1$ and that $d_{sc}$ and $d_{cp}$ are orthogonal. Since $SF_2$ is small ($SF_2$ can be as low as 4 in WCDMA), and since the number of dedicated pilot symbols typically can be $N_2$=4 per slot (see FIG. 1), it is reasonable to assume that $$\left|\frac{1}{N_2}\sum_{k=1}^{N_2}\frac{1}{SF_2}\sum_{l=1}^{SF_2}d_{sc}(l-\tau_i)m\right| > 0. \quad (7)$$

Thus, the spreading gain of the dedicated pilot symbols is generally not sufficient to suppress the DC offset. Hence, the DC offset has to be estimated and removed before user data can be detected.

The estimation and removal of the DC offset is described below. The estimate of the radio channel, $\hat{h}_l$, the scrambling and orthogonal codes ($d_{sc}$, $d_{sd}$), and the a priori common pilot symbols $u_k^p$, $k=1, \ldots, N_1$, are all fed to the DC estimation unit 125. In addition, the received despread dedicated pilot symbols $z_k^{l,dp}$, $k=1, \ldots, N_2$, are also input to the DC estimator unit 125. The DC estimator unit 125 estimates the DC offset as $$\hat{m}_i = \frac{\frac{1}{N_2}\sum_{k=1}^{N_2}(z_k^{i,dp} - \alpha\hat{h}_i u_k^{dp})}{\frac{1}{SF_2}\frac{1}{N_2}\sum_{k=1}^{N_2}\sum_{l=1}^{SF_2}d_{sc}(l-\tau_i,k)d_{cp}(l-\tau_i)} \approx m. \quad (8)$$

The estimated DC $\hat{m}_l$ is then multiplied with $$f_{k,i} = \frac{1}{SF_2}\sum_{l=1}^{SF_2}d_{sc}(l-\tau_i,k)d_{cp}(l-\tau_i). \quad (9)$$

The resulting user data symbol $x_k$ is now formed by subtracting $f_{k,i}\hat{m}_l$ at subtractor 130 from the received data symbol $z_k^l$. The correct user data symbol $x_k^l$ together with the channel estimate $\hat{h}_l$ from each finger 98 of the RAKE receiver 95 are fed to the MRC 135. The MRC 135 combines the signals from each finger 98, and the combined signal is fed to the detection unit 140 to detect transmitted symbols.

Sometimes $\alpha$ is known, then the DC estimation procedure is the same as shown above. When $\alpha$ is not known, it has to be estimated. Thus, both $\alpha$ and m have to be estimated simultaneously. This can easily be done by extending eq. 8 to Least squares estimation, see below. Define $$a_k^1 = h_i u_k^{dp} \quad (10)$$

$$b_k^2 = \frac{1}{SF_2}\sum_{l=1}^{SF_2}d_{sc}(l-\tau_i,k)d_{cd}(l-\tau_i)$$

then $$z_k^{i,dp} = \alpha a_k^1 + m b_k^2 + e_k^{i,dp} = A_k\theta + e_k^{i,dp} \quad (11)$$

and the LS estimate of $\theta=[\alpha m]^T$ is $$\hat{\theta} = \left(\sum_{k=1}^{N_2}A_k A_k^T\right)^{-1}\sum_{k=1}^{N_2}A_k z_k^{i,dp} \quad (12)$$

Further, the alternative method can be extended including enhancement of the $\alpha$ estimate, i.e., $$\hat{\alpha} = \frac{1}{N}\sum_{k=1}^{N}\hat{\alpha}_i \quad (13)$$

Figure 5:
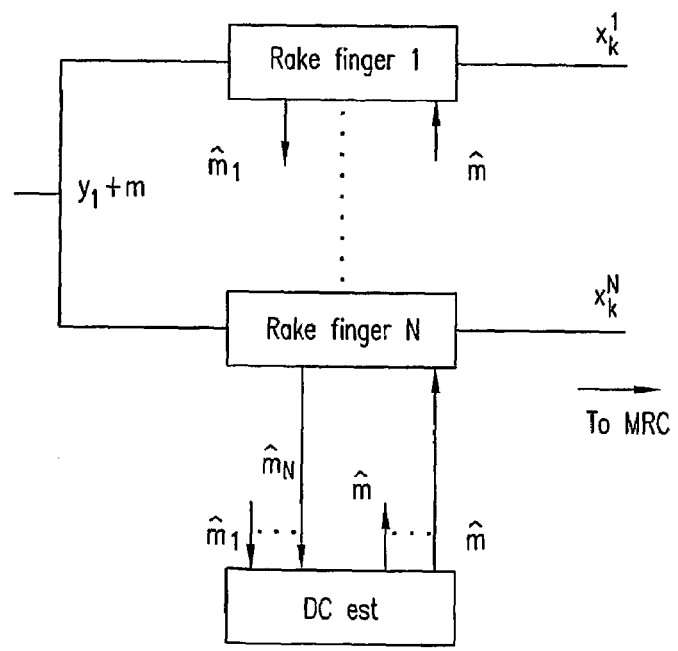
FIG. 5 illustrates an alternative embodiment for performing DC offset compensation within a RAKE receiver.

Referring now to FIG. 5, there is illustrated an alternative method for estimating the DC offset within the RAKE receiver 95. The DC offset m is common for all fingers, and the only difference between the fingers is the factor $f_{l,k}$. Hence, one possibility to obtain a better DC estimate is to make the DC offset compensation based on DC estimates from all N fingers 98. All fingers 98 will instead use the DC offset estimate where $$\hat{m} = \frac{1}{N}\sum_{i=1}^{N}\hat{m}_i \quad (14)$$

where $\hat{m}_l$ is estimated according to $$\hat{m}_i = \frac{\frac{1}{N_2}\sum_{k=1}^{N_2}(z_k^{i,dp} - \alpha\hat{h}_i u_k^{dp})}{\frac{1}{SF_2}\frac{1}{N_2}\sum_{k=1}^{N_2}\sum_{l=1}^{SF_2}d_{sc}(l-\tau_i,k)d_{cp}(l-\tau_i)} \approx m.$$

Figure 6:
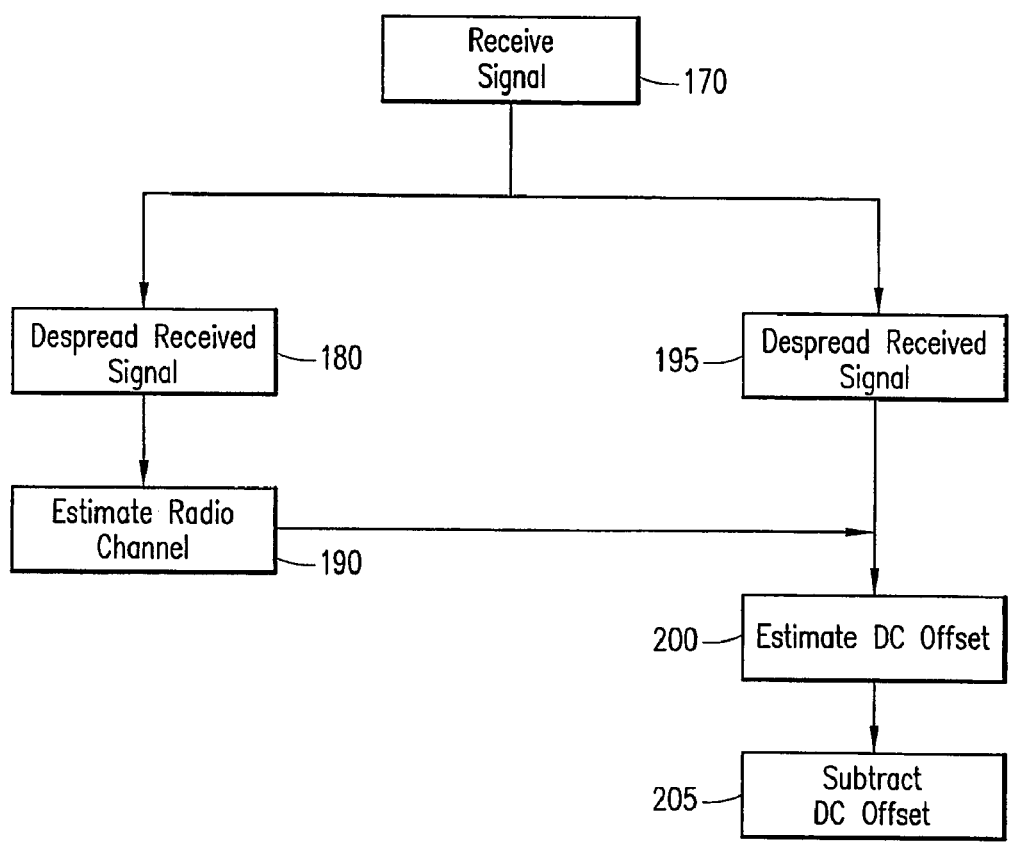
FIG. 6 is a flow diagram illustrating the operation of a RAKE receiver according to the present invention.

Referring now to FIG. 6, there is illustrated a flow diagram describing the method of operation of the RAKE receiver 95 of the present invention. The method for DC offset compensation is initiated upon receipt of a signal at step 170. The signal is despread at step 180 using a first spreading code to generate a first signal. Estimation of the radio channel of the signal is made at step 190 using the first signal and a first set of pilot symbols. The first signal is also despread at step 195 using a second spreading code to provide a second signal. An estimation of the DC offset is made using the second signal, the channel estimate, and a second set of pilot symbols at step 200 The DC offset estimation made at step 200 is subtracted from the second signal at step 205.

The DC offset compensation described above is mainly required for high data rates using low spreading factors. Thus, the receiver may additionally have the ability to turn off the DC compensation block depending on which spreading factor is being used. The described invention is particularly suitable for user equipment or base stations within cellular communications stations. However, the system may be implemented within any communication system requiring improved throughput in high data rate configuration.

The previous description is of a preferred embodiment for implementing the invention, and the scope of the invention should not necessarily be limited by this description. The scope of the present invention is instead defined by the following claims.

What is claimed is:

1. A method for direct current (DC) offset compensation, comprising the steps of:

receiving a first signal; despreading the first signal using a first spreading code to generate a second signal;

estimating a radio channel of the first signal using the second signal and a first set of pilot symbols;

despreading the first signal using a second spreading code to generate a third signal;

estimating a DC offset using the third signal, the estimated radio channel and a second set of pilot symbols; and subtracting the estimated DC offset from the second signal.

2. The method of claim 1, wherein the step of despreading the first signal using the first and the second spreading codes are performed at a plurality of different time offsets.

3. The method of claim 2, wherein the step of estimating the DC offset further comprises the steps of: estimating a first DC offset at each of the plurality of different time offsets; and estimating the estimated DC offset using each of the first DC offsets.

4. The method of claim 1, wherein the step of estimating the DC offset is contingent on the spreading factor for the second spreading code being lower than a predetermined threshold.

5. The method of claim 1, wherein the step of receiving further includes the step of multiplying the received signal by a scrambling code.

6. A method of direct current (DC) offset compensation, comprising the steps of:

receiving a first signal; multiplying the first signal by a scrambling code vector to generate a second signal;

despreading the second signal using a first spreading code to generate a third signal;

estimating radio channels of the first signal using the third signal and a first set of pilot symbols;

despreading the second signal using a second spreading code to generate a fourth signal;

estimating received data symbols including a DC offset from the fourth signal;

estimating a DC offset using the estimated radio channels, the estimated received data symbols including the DC offset, the scrambling code and orthogonal codes; and subtracting the estimated DC offset from the estimated received symbols.

7. The method of claim 6, wherein the step of estimating the DC offset further comprises the steps of:

estimating a first DC offset at each of the plurality of different time offsets; and estimating the estimated DC offset using each of the first DC offsets.

8. The method of claim 1, wherein the step of estimating the DC offset is contingent on the spreading factor for the second spreading code being lower than a predetermined threshold.

9. A RAKE receiver, comprising: a plurality of fingers, each finger comprising:

a first multiplier for despreading a first signal to generate a second signal using a first spreading code;

a channel estimator for estimating radio channels from the second signal and a first set of pilot symbols;

a second multiplier for despreading the first signal to generate a third signal using a second spreading code;

a summer for estimating received data symbols including a DC offset from the third signal;

a direct current (DC) offset estimator for estimating the DC offset responsive to the estimated radio channels, the estimated received date symbols including the DC offset, scrambling codes and orthogonal codes; and a subtracter for subtracting the estimated DC offset from the estimated received data symbols including the DC offset.

10. The RAKE receiver of claim 9, further including a third multiplier for multiplying the received signal by a scrambling code vector to generate the first signal.

11. A wideband code division multiple access (WCDMA) receiver, comprising:

an antenna for receiving a digital signal; a direct conversion receiver for down-converting the digital signal to a baseband signal including a direct current (DC) offset;

a path searcher for determining a delay between each radio path of the baseband signal including the DC offset;

a RAKE receiver for determining channel estimates for each radio path in the baseband signal including the DC offset and for determining DC offset compensated signals for each of the radio paths;

a maximum ratio combining unit for combining the DC offset compensated signals into a combined signal; and a detection unit for detecting a transmitted symbol from the combined signal wherein the RAKE receiver further comprises a plurality of fingers, each of the plurality of fingers comprising: a first multiplier for despreading a first signal to generate a second signal; a channel estimator for estimating radio channels from the second signal and a first set of pilot symbols; a second multiplier for despreading the first signal to generate a third signal using a second spreading code; a summer for estimating received data symbol including a DC offset from the third signal; a DC offset estimator for estimating the DC offset responsive to the estimated radio channels, the received data symbols including the DC offset, scrambling codes and orthogonal codes; and a subtractor for subtracting the estimated DC offset from the estimated received data symbols including the DC offset.

12. The WCDMA receiver of claim 11, wherein the RAKE receiver further comprises:

further including a third multiplier for multiplying the received signal by a scrambling code vector to generate the first signal.

* * * * *